July 21, 1936. F. MAZZINI 2,048,278
AIR CIRCULATION VALVE IN THE SUPPORTING SURFACES OF AEROPLANES
Original Filed June 29, 1934
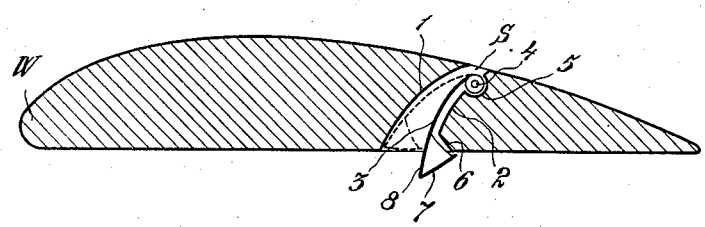
Inventor
FRANCO MAZZINI
By Emil Bönnelycke
Attorney Patented July 21, 1936

2,048,278

UNITED STATES PATENT OFFICE 2,048,278

AIR-CIRCULATION VALVE IN THE SUPPORTING SURFACES OF AEROPLANES

Franco Mazzini, Milan, Italy

Original application June 29, 1934, Serial No. 733,133. Divided and this application November 29, 1935, Serial No. 52,246. In Italy July 5, 1933

4 Claims. (Cl. 244—12)

This application is a division of my copending application, Serial No. 733,133, filed June 29, 1934.

The development of aeronautical construction has led to an improvement in aerodynamic form of aeroplanes and to a considerable increase in the surface loading of their supporting planes. In consequence, it is necessary to provide aerodynamic braking arrangements which enable the landing speed to be reduced to within the limits of safety. The object of the present invention is to attain this result by means of the simple rocking of a valve device arranged longitudinally of an opening formed longitudinally of the wing, and enclosed in the interior of the said wing in such a manner as to enable, at any desired instant, a circulation of air to be established between the lower surface and the upper surface, which produces a considerable increase in drag and an appreciable reduction in landing speed, while maintaining, and even increasing, the lift.

To accomplish this object, valves are employed which are adapted to fit in openings leading from the lower surface to the upper surface of the wings of aeroplanes, and which are formed by an element movable under the influence of a suitable control device, the element occupying substantially the full depth of the opening and being so formed that in one extreme position it completely closes the said opening, while in the other extreme position provides a wholly unobstructed passage through the opening, having smooth and properly formed boundaries, which guides the stream of air without causing sudden changes of section or direction.

The invention depends essentially on the fact that during normal flight the valve device conforms exactly to the outer profile of the wing and does not alter its aerodynamic performance. The valve can be opened at any speed of the machine (that is to say, corresponding to any angle of incidence of the wings) by means of a simple control device, so as to allow of the establishment of an air circulation which has a braking effect. If the operation of the valve is confined to times when the angle of incidence is large, its movement may be effected automatically, the valve being balanced with the aid of a suitable pendulum system.

The valve may be placed at any desired position along the wing section. In the accompanying drawing, the position selected is at two-thirds of the chord length, measured from the leading edge, in view of the fact that in the ordinary construction there are no obstructions (principal structural members, controls, and so forth) at this position. The valve device is applicable to wings of various sections, and it can be formed in different ways.

In order to make my invention more clearly understood, I have shown in the accompanying drawing means for carrying the same into practical effect, without limiting the improvements in their useful applications to the particular structure which, for purposes of explanation, have been made the subject of illustration.

The single figure of the drawing is a somewhat diagrammatic sectional view of a wing embodying the present invention.

As shown in the drawing, the wing W is provided with a slot S extending longitudinally across the same and providing a passageway for the flow of air from the lower to the upper surface of the wing. This slot or passage S has a forward wall 1 and a rear wall 2. The forward wall 1 is smooth and unobstructed and curves rearwardly near the upper wing surface. The rear wall 2 is recessed at 5 to receive the rock shaft 4 and near the lower surface of the wing at 6.

A valve body 3 consisting of a smooth-surfaced curved plate is attached to rock shaft 4 which serves as a means for controlling the position of the valve. The plate forming the valve body is of a length sufficient to abut the intersection of the forward wall 1 of slot S and the lower surface of the wing as indicated in dotted lines in the drawing.

The contour of wall 2 is such that when valve 3 is in open position the passageway between the wall 1 of slot S and face of valve 3 is of decreasing cross-section from the lower to the upper wing surface and curves rearwardly. This construction has been found to be particularly advantageous.

It will be observed from the drawing that the lower portion 8 of valve plate 3 extends beneath the lower wing surface when in open position. This extending portion serves as a scoop for scooping the air flowing beneath the lower wing surface into the passageway formed between wall 1 and the valve plate.

In order to avoid disturbance of the flow of air beneath the lower surface of the wing when the valve 3 is closed, a closure 7 is provided for closing the opening in the lower wing surface so that said under surface will be smooth and unbroken.

It will be realized that the present invention provides a simple and satisfactory construction which advantageously improves the operation of slotted wings.

While I have shown and described the preferred embodiment of my invention, I wish it to be clearly understood that I do not confine myself to the precise details of construction herein set forth by way of illustration, it being apparent that many changes and variations may be made therein by those skilled in the art without departing from the spirit of the invention or exceeding the scope of the appended claims.

I claim:—

1. An aeroplane wing having a laterally elongated passage leading from the lower to the upper surface thereof, said passage having front and back walls which are smooth and free from sudden changes of direction, a plate hinged at one of its extremities to the end of one of said walls and having a profile similar to that of the wall to which it is hinged, and control means operable for moving said plate alternatively into a position flush with said last-mentioned wall, and across said passage so that the free edge of the plate contacts with the opposite wall.

2. An aeroplane wing according to claim 1, in which the plate is extended to form an air scoop serving when the plate is in its open position to engage air flowing over said lower surface.

3. A wing for aircraft having a laterally elongated passage extending from its under to its upper surface, a valve member in the passage movable from a closed to a full open position, said valve member in all positions of partial and full opening providing an unobstructed conduit with all its walls smooth and free from abrupt changes in direction from the under to the upper wing surface, said valve member having a single wall defining the rear wall of the unobstructed conduit, the front wall of which is provided by the passage through the air foil, and a pivot, about which the valve member is movable, located entirely outside the conduit.

4. An aeroplane wing according to claim 1, in which the plate is extended to form an air scoop serving when the plate is in its open position to engage air flowing over said lower surface, and means carried by the lower end of said scoop for closing the opening in the lower surface of the wing when the valve is in closed position.

FRANCO MAZZINI.